• United States Patent                (10) Patent No.:     US 6,932,025 B2
Massingill et al.                      (45) Date of Patent:        Aug. 23, 2005

(54) SCALABLE FISH REARING RACEWAY SYSTEM

(75) Inventors: Michael J. Massingill, San Diego, CA (US); Rodney J. Chamberlain, Indio, CA (US); James M. Carlberg, San Diego, CA (US); Jon C. Van Olst, Bonsall, CA (US)

(73) Assignee: Kent SeaTech Corporation, San Diego, CA (US)

( * ) Notice: Subject to any disclaimer, the term of this patent is extended or adjusted under 35 U.S.C. 154(b) by 0 days.

(21) Appl. No.: 10/714,799

(22) Filed: Nov. 17, 2003

(65) Prior Publication Data

US 2005/0120970 A1    Jun. 9, 2005

(51) Int. Cl.⁷ .............................................. B05C 1/00
(52) U.S. Cl. ..................... 119/216; 119/200; 119/206; 119/215; 119/219; 119/225; 119/226; 119/227
(58) Field of Search ..................... 119/216, 200, 206, 119/215, 219, 225, 226, 227

(56) References Cited

U.S. PATENT DOCUMENTS

| 3,661,119 A | * | 5/1972 | Sanders ...................... 119/217 |
| 4,086,875 A | * | 5/1978 | Lindbergh .................. 119/216 |
| 4,394,846 A | * | 7/1983 | Roels .......................... 119/212 |
| 4,593,647 A | * | 6/1986 | Sorgeloos et al. .......... 119/205 |
| 5,320,068 A | * | 6/1994 | Redditt ....................... 119/226 |
| 5,353,745 A | * | 10/1994 | Fahs, II ...................... 119/226 |
| 5,820,759 A | * | 10/1998 | Stewart et al. .............. 210/602 |
| 6,041,738 A | * | 3/2000 | Hemauer et al. ........... 119/226 |
| 6,117,313 A | * | 9/2000 | Goldman et al. ........... 210/151 |
| 6,447,681 B1 | * | 9/2002 | Carlberg et al. ............. 210/602 |

FOREIGN PATENT DOCUMENTS

| JP | 62068591 A | * | 3/1987 | ............. C02F 3/20 |
| JP | 04135434 A | * | 5/1992 | .......... A01K 63/02 |

* cited by examiner

Primary Examiner—Peter M. Poon
Assistant Examiner—Andrea M. Valenti
(74) Attorney, Agent, or Firm—Richard D. Clarke

(57) ABSTRACT

A scalable fish rearing raceway system is provided, incorporating a fish containment structure having two semi-circular end sections, and two or more parallel fish raceways, surrounding a central zone for housing water treatment systems and a secondary fish crop. Heavy particulates are eliminated from the main fish rearing channels by use of conical areas located at either end of the parallel elongated raceways. Continuous removal of dead or dying fish from the raceway is accomplished by means of a floating mortality catcher consisting of a screened ramp at the surface of the cones which continuously collect moribund and dead fish. Grading bars separate and move fish underwater to an adjacent raceway through a common fish transfer channel. This larger scalable fish production system substantially reduces the direct labor and capital costs associated with the production of fish as compared with conventional circular fish rearing tanks.

19 Claims, 7 Drawing Sheets

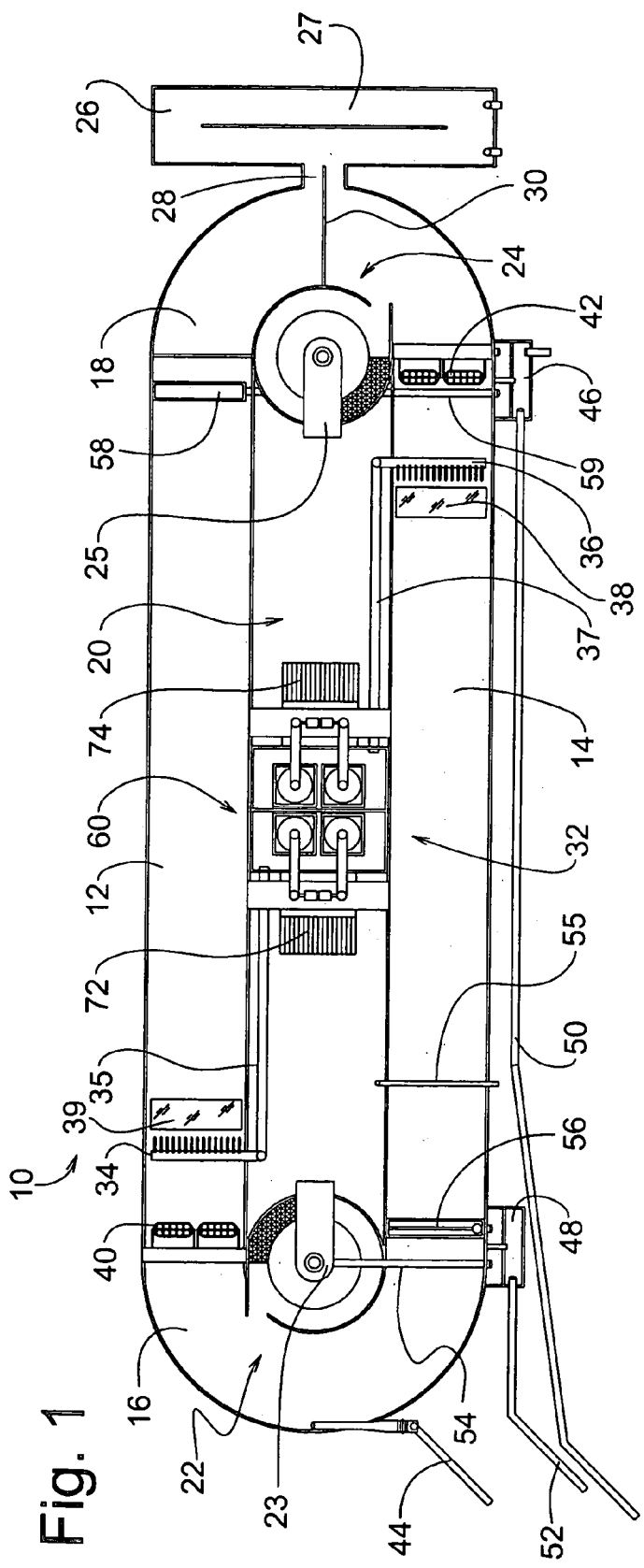
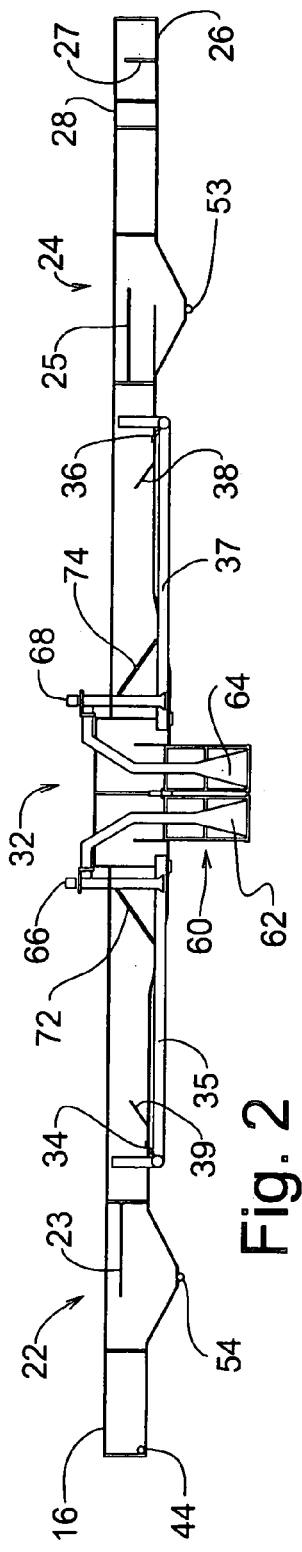
Fig. 1
Fig. 2

SCALABLE FISH REARING RACEWAY SYSTEM

BACKGROUND OF THE INVENTION

1. Field of the Invention

The present invention relates to a scalable fish rearing raceway system and method of making same. More particularly, the present invention relates to a new and improved scalable fish rearing raceway system including a greatly increased fish culture zone, unique fish harvesting/grading channel component, and integrated monitoring and feeding means which greatly reduces direct labor associated with all aspects of the fish rearing process.

2. Description of the Related Art

As health conscious Americans begin to consume more fish products and the naturally occurring sources of fish become depleted, there is a growing need to fill the demand for fish products by turning to aquaculture. Aquaculture is defined as the production and husbandry of aquatic plants and animals in controlled environments. The term husbandry means the application of scientific principles to farming. Controlled environments are directed or regulated production environments ranging from a low level of control, termed "extensive," where limited capital and management are applied, to a high level of control, termed "intensive," where more comprehensive capital and management are applied to production.

Aquaculture has become a one billion dollar industry in the U.S. Nearly 30% of our edible seafood supplies are currently supplied by aquaculture. Growing at a rate of 20% per year, aquaculture is the fastest growing sector of the agriculture industry. Aquaculture is an ecologically efficient means of providing seafood for American consumers while significantly reducing pressure on our limited wild fisheries resources.

Foreign competition is having a major impact on U.S. aquaculture operations. More than 60% of our seafood supplies are now imported, resulting in a large annual trade deficit ($6.9 billion). A growing fraction of aquaculture imports comes from the warm climates of South America and Asia. These countries have the advantage of lower production costs by using abundant quantities of warm water that are available in the tropics. Often there are few or no environmental laws controlling their discharges which result in environmental degradation and little or no overhead costs associated with complying with environmental laws. Imports of fish grown in Chili, Costa Rica, Ecuador, Taiwan, China, Vietnam and Indonesia have increased markedly as the foreign competition adopts new culture technologies, often developed here in the U.S. These competing products are produced with low energy, water, labor, and environmental costs. As a result, many U.S. aquaculture products are not competitive with foreign aquaculture products.

Efficient, economical and productive aquaculture in the United States would meet the growing demands of fish in the American diet, would remove a huge burden on our natural wildlife resources and would also reduce our dependence on imports.

Previously, open ponds were developed for use in aquaculture. These earthen ponds were scalable and required relatively small initial capital expenditures to construct, but required large land masses, were inefficient because of the ratio of square footage and consumptive gallons of water required per unit produced. Additionally the growing conditions and water quality in these ponds was difficult to monitor and control, harvesting was hit or miss, diseases were common and solid waste products and particulates were difficult to remove. Today, fresh water is becoming a rare commodity and there is an increasing need for more efficient usage of both land and water resources.

The current cutting edge technology for aquaculture in the United States employ round tanks that are provided with extensive pipe systems to provide fresh water and oxygen. Each of these tanks is equipped with fish feeders, control and monitoring equipment to continuously check water quality, water flow, dissolved gas content of the water and other parameters that would affect fish growth.

These tanks require a high level of maintenance which includes frequent manual removal of dead fish to minimize the incidence of disease within the confines of the tank. Upon death, fish will first sink to the bottom of the tank, then within the first 24 hours, plus or minus 2 to 4 hours depending upon water temperature and decomposition rates, will float to the surface. Thereafter, the carcass will continue to float on the surface waters of the tank where it will continue to decompose and serve as an incubator for disease causing organisms. The process of decay also produces by-products such as nitrogen compounds which adversely affect the water quality within the tank. This necessitates continuous monitoring and immediate removal of dead and dying fish.

Additionally, the size of the fish held within the tank must be kept relatively uniform to reduce the incidence of cannibalism in the fish population. The fish sorting required to maintain the sizing restrictions often requires mechanical or physical handling and relocation of the fish resulting in stress and trauma which can adversely affect the mortality, overall health and growth rate of the fish.

The harvesting of fish from such facilities is usually accomplished in much the same manner as harvesting of fish has occurred for centuries, use of nets for physical removal from the tank. This method is often less than efficient and may result in additional stress and physical damage to the fish during harvesting.

The round shape of these tanks provides an uneven current speed within the tank. Water on the outer perimeter of the tank is propelled at a higher rate of speed than the water in the center of the tank. Each species of fish prefers a particular rate of speed of water resulting in a sizeable percentage of the tank having a flow rate that will not be suitable for optimal fish habitat. If the water flow is slowed to provide for optimal fish habitat in the outer perimeter of the tank, the particulates in the water may settle to the bottom of the tank where removal of such particulate matter would require additional mechanical means of removal.

The current technology is very expensive to build and maintain, and becomes even more labor intensive and costly as the number of tank units increase. Round tanks are not readily scalable to larger systems because of the inherent problems in flow rate differentials and water mixing (as discussed below). This limits the diameter-to-depth ratio of round tanks to about 10:1. Since water depths are typically 5 feet or less for practical considerations (fish management, personnel safety, and construction cost), the effective maximum diameter of round tanks is about 50 feet. This has become a significant problem in constructing economically efficient large fish farms. The extreme number of round tanks required for large-scale fish production is counter-productive as they result in increased operational costs and no construction savings, on a cost-per-pound of fish produced basis. As effective as round tanks can be for small niche aquatic businesses or research systems, they do not offer the economy-of-scale opportunities necessary in the competitive environment of large-scale commercial aquaculture.

The concept of, and methods for aquacultural fish raising are well known and documented. Examples of different types of devices, methods and systems, water treatment units and techniques that might be suitable for aquaculture are disclosed in U.S. Pat. Nos. 6,382,134 B1, 6,192,833, 5,961, 831, 4,915,059, 4,913,093, 4,516,528 and 4,300,477.

Fish rearing systems utilizing recycled water as a means of maintaining an aquaculture system have been explored. U.S. Pat. No. 6,382,134 B1 describes such a system. The system incorporates traps and screens for removal of particulate matter, denitrification devices, a disinfection device and ammonia treating devices. The system also incorporates an aeration device (for addition of oxygen and removal of carbon dioxide) and a means of monitoring water quality.

While this novel invention provides for means of removal of many of the gross particulates from the water by means of a trapping section at the bottom of the tank, it does not address the major problem of removal of dead and dying fish on a continuing basis. As previously mentioned, the dead or dying fish will sink to the bottom for the first 24 hour period after death, before floating to the top where they might be removed by mechanical means (with sunken dead fish potentially removed by the trapping section at the bottom of the tank). The presence of dead or dying fish represents a major potential source of disease which could affect the fish population in an entire system. Disinfection of a small portion of the water without prompt removal of the source of infection would not prevent the spread of the infection throughout the fish population due to physical contact with the decaying matter.

Prompt and continuous removal of dead and dying fish appears to offer the best preventative measure against widespread contamination and spreading of disease throughout a contained fish population. Therefore it would be highly desirable to have a new and improved scalable fish rearing raceway system and method of making same which would provide for continuous removal of dead fish from the raceway. The continuous mechanical removal of dead and dying fish significantly reduces labor costs associated with the frequent human monitoring and manual removal of such fish and reduces the transmittal of infectious diseases by the immediate removal of the dead and dying fish.

An aquaculture system which teaches a process or system for raising aquatic organisms is disclosed in U.S. Pat. No. 6,192,833. Therein, a system is provided that incorporates a raceway for producing and maintaining the organism and an algal growth channel with monitors and paddlewheel for flow control.

This system does not provide for means of particulate removal or removal of dead or dying fish. There is no means of providing for sizing of fish and, additionally, there is no provision for a harvesting channel. This novel invention does not provide for scalability of such a channel.

Therefore, it would be highly desirable to have a new and improved scalable fish rearing raceway system and method of making same for aquaculture products which would provide a sequential combination of subsystems for removal of the solid particulate matter as well as dead and dying fish. Furthermore, it would be highly desirable if such a system provided a separate channel or holding area for harvesting fish, moving fish to other tanks, and for uniform optional sizing of fish that can be incorporated into the raceway or channel, and which would be scalable.

The aquaculture system disclosed in U.S. Pat. No. 5,961, 831 consists of one or more culture tanks connected to a closed system of filters and ultraviolet or ozone sources for water purification prior to returning water to the culture tanks. This invention also provides for sensors for continuous monitoring of water quality. However, as seen previously, there is no provision for removal of dead and dying fish which represents one of the most important potential reservoirs of disease within an aquaculture environment.

Therefore, it would be highly desirable to have a new and improved scalable fish rearing raceway system and method of making same which would provide for methods of particulate removal, but perhaps most importantly, provide for continuous mechanical removal of dead fish from the raceway by means of a floating mortality catcher consisting of screened ramps which collect moribund and dead fish, as well as a novel system for the prompt removal of freshly sunken dead fish.

As previously mentioned, many of the inventive systems utilized by aquaculture up until very recently have used multiple tanks for rearing of fish. Most of these systems were designed to utilize relatively small round tanks. Increasing the diameter of these small round tanks reveals inherent design restrictions that prevent efficient usage of the entire interior of the tank for rearing fish due to the centrifugal current differential within the confines of the circular space. Since increased tank diameter exacerbates the differential in water velocity within the tank, these large round tanks become inefficient in terms of space utilization. Additionally, the ability to scale them to a larger size would not be cost effective. Moreover, the space between the numerous tanks is essentially wasted space with respect to fish rearing operations.

The invention in U.S. Pat. No. 4,913,093 describes such a multi-tank aquaculture system. A method of culturing fish in a plurality of tanks with each tank comprising a relatively independent growing environment would require enormous capital and labor expenditures per fish produced. In addition, the invention requires periodic subdivision of the fish population into separate tanks when the capacity of the tank is reached. Physically sorting and moving the fish from tank to tank would result in a great deal of trauma and possibly injury to the fish.

Therefore, it would be highly desirable to have a new and improved scalable fish rearing raceway system and method of making same which would provide scalability, low capital expenditure, low labor cost per fish produced, efficient use of space, a means of separating fish by size, and a means by which those fish might be moved or harvested in an efficient manner without trauma or injury.

Another aquaculture rearing system is described in U.S. Pat. No. 4,300,477 which provides for clustered, vertical rearing tanks. Multiple, stackable habitats in the form of baskets are attached to a strongback member which houses a removable feeding rod. There is no means provided for removal of heavy particulates, dead or dying fish or providing for circulation of water through the tank.

Progressive space increments are provided by two different size baskets and removable dividers. The fact that these multiple habitats are individually removable suggests that the size of the baskets are relatively small and that the number of units of fish per basket is severely limited. This ratio of capital expenditure (and labor costs) per unit produced is extremely high. Additionally, the trauma involved in physical separation of the fish by size into each basket would be very high.

Additionally, there is no means provided for removal of dead or dying fish on a continuous basis, so the likelihood of spread of disease from the presence of dead or dying fish would seem to be overwhelming.

Therefore, it would be highly desirable to have a new and improved scalable fish rearing raceway system and method of making same which would provide a method by which particulates in the wastewater stream would be automatically removed. It would also be highly desirable to provide such a new and improved aquaculture raceway system with a means of providing fresh circulating oxygenated water, a water treatment process, and a means of removing dead and dying fish on a continuing basis. It would also be highly desirable to provide such fish sorting, removal of dead and dying fish, provision of fresh or reconditioned circulating water in a cost effective, efficient and scalable manner.

The present invention proposes a new and improved circular raceway for use in an aquaculture system and method of using same. The proposed raceway is easily scalable, is cost effective and efficient, and provides for more uniform water current velocities throughout the production tank.

SUMMARY OF THE INVENTION

Therefore, the principal object of the present invention is to provide a new and improved scalable fish rearing raceway system and method of making same. More particularly, the present invention relates to a new and improved scalable fish rearing raceway system including a greatly increased fish culture zone, water velocity control means, unique fish harvesting/grading channel component, and integrated water quality monitoring and feeding means which greatly reduces direct labor associated with all aspects of the fish rearing process.

It is a further object of the present invention to provide such a new and improved scalable fish rearing raceway system and method of making same that incorporates an integrated water treatment unit which would remove particulates, dead and dying fish, excess nitrogen and carbon dioxide compounds and provide for aeration of the water before returning the water to the scalable fish rearing raceway system.

It is yet a further object of the present invention to provide such a new and improved scalable fish rearing raceway system and method of making same which may be stocked with fish of the same size for batch growth or may alternatively provide for optional grading bars for automatically grading fish by size.

Briefly, the above and further objects of the present invention are realized by providing a new and improved scalable fish rearing raceway system and method of making same which provides for the largest tank ever used to culture warm water fish at high densities, utilizing an elongated portion to maintain optimal current speed. This larger production unit substantially reduces the direct labor associated with the monitoring, feeding and harvesting of fish on a per fish basis, and requires lower capital costs since it requires fewer components such as monitors, feeders, emergency oxygen diffusers and other equipment per unit of fish produced.

A novel means of eliminating heavy particulates is seen in the use of conical areas located at either end of an elongated raceway, out of the main fish channel. Effluent water leaves the raceway through these hydrocones where heavy waste particles settle in the conical zones aided by the centrifugal forces of the circular flow patterns and exit the bottom drains in the cones to the outside drain boxes. In addition, heavy waste is also removed by means of screened channels cut into the floor of the linear raceways.

Continuous removal of dead fish from the raceway is accomplished by means of a sinking fish mortality catcher consisting of a screened ramp at the entrance to the hydrocones which collect both moribund (sunken) and "long" dead (floating) fish. A similar device is mounted at the main drain box on the outside of the raceway to capture dead and floating fish. The continuous removal of dead and dying fish significantly reduces labor costs associated with the frequent manual removal of such fish and reduces the transmittal of infectious diseases by the immediate removal of the dead and dying fish.

This heavy waste containing water is removed from the circular raceway to a center water treatment channel where a crop of secondary detritevore feeding fish forage on particulate matter.

The water then enters an oxygenation zone. This oxygenation zone may also contain submerged biofiltration media to enhance nitrification of ammonia waste. A screen prevents the secondary detritivore feeding fish from entering this area. Several surface paddlewheel aerators are used to remove dissolved carbon dioxide gas from the water. The water then enters a U-tube oxygenation system which consists of four cells where injected oxygen gas is dissolved into the water. This highly oxygenated water is returned to the fish culture zone of the raceway through a series of water jets in the floor of the raceway located at the distal ends of the linear sections of the raceway. Water is also fed into the raceway from two alternative sources: (a) an extensive filtration system composed of particulate removal by fish and mechanical screens, two nitrification reactors and a series of constructed wetland ponds; and (b) well water which has been filtered through a desaturation column to remove dissolved nitrogen gas.

Several probes monitor and control dissolved oxygen levels in the water. These monitors are connected to a centralized alarm and computer monitoring system. If necessary, an emergency oxygen system is activated which injects oxygen into the water from an alternative source, when oxygen levels reach a critical level.

Additionally, the raceway is equipped with feed silos that can dispense feed of several sizes and multiple frequency throughout the day. The number and size of fish present is monitored and graded by an electronic underwater scanning device (using infrared or acoustical technology) coupled to a computer microprocessor which reduces the handling stress associated with the counting, grading and netting of fish.

The raceway can be stocked with uniform sized fish which are grown to market size as a batch culture. Alternatively, grading bars can periodically separate the larger fish, which are then counted and moved underwater to an adjacent raceway through the common fish transfer channel, and the resulting space restocked with smaller fish. This provides a continuous grading and restocking method which results in less cannibalism and a much greater annual yield (in pounds of fish produced).

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a plan view of one embodiment of the scalable fish rearing raceway system constructed in accordance with the present invention, illustrating a single stand-alone parallel linear fish rearing area with semi-circular ends, and the positioning of the central water treatment zone, two hydrocone structures, passive fish mortality removal ramp, and fish harvesting/grading channel;

FIG. 2 is a side elevational cross-sectional view of the scalable fish rearing raceway system constructed in accordance with the present invention, illustrating the positioning of the central water treatment zone, two hydrocone structures and fish harvesting/grading channel;

DESCRIPTION OF THE PREFERRED EMBODIMENTS

Figure 3:
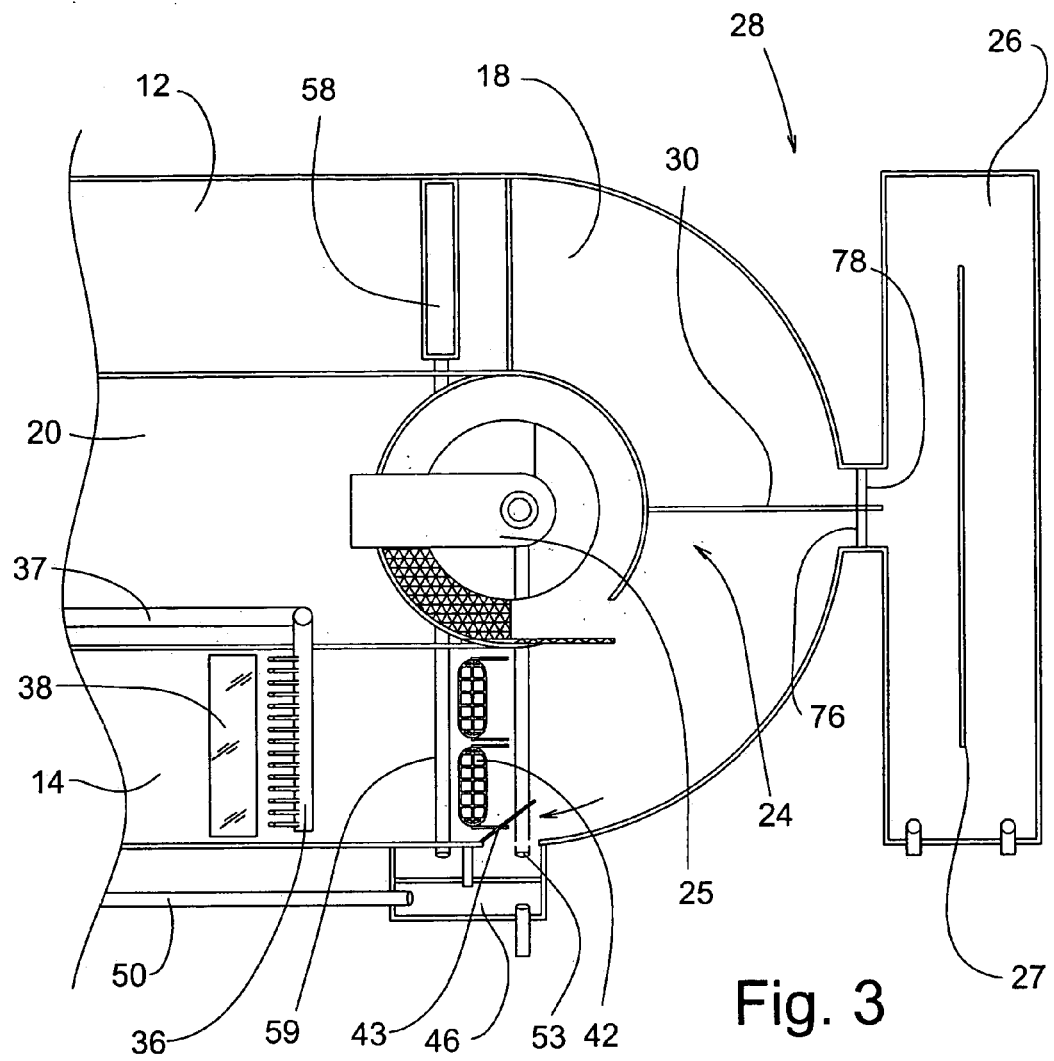
FIG. 3 is an enlarged partial plan view of one end of the of the scalable fish rearing raceway system constructed in accordance with the present invention, illustrating the hydrocone structure, passive fish mortality removal ramp and fish harvesting/grading channel in greater detail.

Referring now to the drawings, and more particularly to FIG. 1 thereof, there is shown a new fish rearing system 10 which consists of two elongated parallel fish channel raceways 12 and 14 and two semi-circular end sections 16 and 18 which are located at either end of the elongated fish channel raceways 12 and 14.

The new fish rearing system 10 also incorporates an inner water treatment zone 20 where a secondary detritivore fish species, such as tilapia or carp, may be stocked to remove particulate matter. Two hydrocone structures 22 and 24 are located at either end of this inner water treatment zone 20. The hydrocone structures 22 and 24 are provided with overflow trays 23 and 25. The overflow trays 23 and 25 direct the water from the top of the hydrocone structures 22 and 24 to the inner water treatment zone 20.

A harvesting/grading channel 26 is located at one end of the fish rearing system 10. A partition wall 27 is located along a portion of the midline of the harvesting/grading channel 26. The harvesting/grading channel 26 is connected to the fish rearing system 10 by means of a harvesting/grading portal area 28. The harvesting/grading portal area 28 receives the distal end of the permanent stationary grader panel 30 along the midline of the harvesting/grading portal area 28. The permanent stationary grader panel 30 raises up and down as needed (raising up out of the water when not in use for continuous grading).

Sloped screens 72 and 74 are located within an inner water treatment zone 20 which may be equipped with submerged biofiltration media to enhance nitrification of ammonia waste. This inner water treatment zone 20 is adjacent to the central pump head tank 32. This central pump head tank 32 pumps water through the U-tube oxygenation system 60 to the water jet outlets 34 and 36 at one end of each of the elongated fish channel raceways 12 and 14 by means of the water jet supply pipes 35 and 37.

Paddlewheels 40 and 42 are located at the proximal end of each of the elongated fish channel raceways 12 and 14. Alternatively, the paddlewheels can be located within the inner water treatment zone 20. Fresh water enters the elongated fish rearing system 10 by means of an inflow fresh water pipe 44.

Two drain boxes 46 and 48 are located at each end of one of the elongated fish channel raceway 14 and remove effluent water from the elongated fish channel raceway oval 10 by means of effluent pipes 50 and 52. The effluent water enters the drain boxes 46 and 48 through a hydrocone drain line 54, and drainpipes as exemplified by drainpipe 59 for the fish channel drain boxes 56 and 58. Water may be drained from the center zone 20 by means of the center zone drain pipe 55.

The water velocity in the fish zone is a function of the water returning from the inner water treatment zone 20 after it has been pumped through the U-tube oxygenation system 60. This water re-enters the fish zone through the water jet outlets 34 and 36 at both ends of the tank. The U-tube pumps primary function is to provide a constant non-variable flow of water into the U-tubes for oxygenation. Secondarily, these pumps provide the force to bring water into the central water treatment area 20, and to provide the energy to create a water velocity field in the fish zone. In this regard, they create a constant water velocity resulting from their pumping rate, pressure, and the specific floor nozzle design of water jet outlets 34 and 36. When the tank was initially put into production, we found that the water velocity was too high in the fish zone, and resulted in excess exercising of our fish and poor fish growth. Therefore, we designed and added controllable floor spoilers 38 and 39, comprising flush hinged plates that can be raised immediately downstream of the water jet outlets 34 and 36. These controllable floor spoilers 38 and 39 act much like a spoiler on an aircraft wing and re-direct the water leaving the water jet outlets 34 and 36 into a more upward direction. This results in an overall reduction of water velocity within the fish zone that is proportional to the spoiler deflection angle. With these spoilers 38 and 39, one can control the water velocity between 0 to 2.0 ft/second. In fact, if the spoilers 38 and 39 are raised to their full up position, it is possible for one to reverse the water flow direction in the fish zone. In practice, one would normally set the spoilers to provide a water current that keeps the waste particulate matter (including dead fish) from settling, providing quick final removal by the drains 56 and 58 and hydrocone structures 22 and 24 (approximately 0.25–1 fps). This velocity can be optimized to improve tank water quality and quickly remove dead fish, yet not force the fish to swim at an excessive speed, thereby maintaining normal fish metabolic rates and maximizing fish growth potential. However, spoilers 38 and 39 can be retracted to provide short periods of increased water velocity to provide increased tank cleaning when needed, or to enhance harvesting operations.

Referring now to FIG. 2, this illustration provides a side elevational cross-sectional view of the scalable fish rearing raceway system. The cross-section of semi-circular end section 16 shows the fresh water inflow pipe 44. Heavy waste particles settle in the bottom of the hydrocone structures as exemplified by hydrocone structures 22 and 23, and are removed by means of the hydrocone drain lines 53 and 54. The cross section of the overflow trays as exemplified by overflow trays 23 and 25 directs excess water into the inner zone 20.

Sloped screens 72 and 74 are located on either side of the central pump head tank 32. These sloped screens 72 and 74 retain the secondary detritivore fish stock in the inner water treatment zone 20. A U-tube oxygenation system 60 is comprised of U-tube pumps 66 and 68, and U-tube cone bottom outlets 62 and 64. Water from pumps 66 and 68 is pumped through U-tubes 62 and 64, through the central pump head tank 32, to the water jet outlets 34 and 36 by means of the water jet supply pipes 35 and 37 (shown in greater detail in FIG. 10). Here, the floor spoilers 38 and 39 are shown adjusted to about a 45 degree angle from the raceway floor. The harvesting/grading channel 26 is shown in cross-section with the partition wall 27 and the harvesting/grading portal area 28.

Referring to FIG. 3, an enlarged partial plan view of one end of the of the scalable fish rearing raceway system, the hydrocone structure 24 and hydrocone overflow tray 25 are shown at one end of the inner water treatment zone 20. The end portion of the elongated fish channel raceway 12 is adjacent to the semi-circular end section 18.

A water jet supply pipe 37 located in the inner water treatment zone 20 provides oxygenated water to the water jet outlets 36 located in the fish channel raceway 14. The paddlewheels 40 (shown in FIG. 1 and FIG. 5) and 42 (shown here) removes carbon dioxide from the water. A passive floating dead fish removal apparatus is constructed of a submerged screen panel 43. Floating dead fish travel with the water flow in the direction of the arrow shown and with the aid of centrifugal force are sent to the outside wall into the screen panel 45 and deposited within drain box 46 for easy collection. The same apparatus could also be set up on the other end of the fish rearing system 10, thereby depositing floating dead fish into drain box 48.

A fish channel drain box 58 collects large particles of solid material which is removed from the elongated fish channel raceway 12 by the drain pipe for the fish channel drain box 59 to the drain box 46. The combined effluent from the drain box 46 is removed for treatment by the effluent pipe 50.

The harvesting/grading portal area 28 accommodates the distal portion of the permanent stationary grader panel 30 which when mechanically lowered into the water, sorts the fish by size on a continuous basis. Grader gates 76 and 78 provide continuous mechanical sorting of fish into the harvesting/grading channel 26. This harvesting/grading channel 26 contains a partition wall 27 to provide ease in harvesting.

Figure 4:
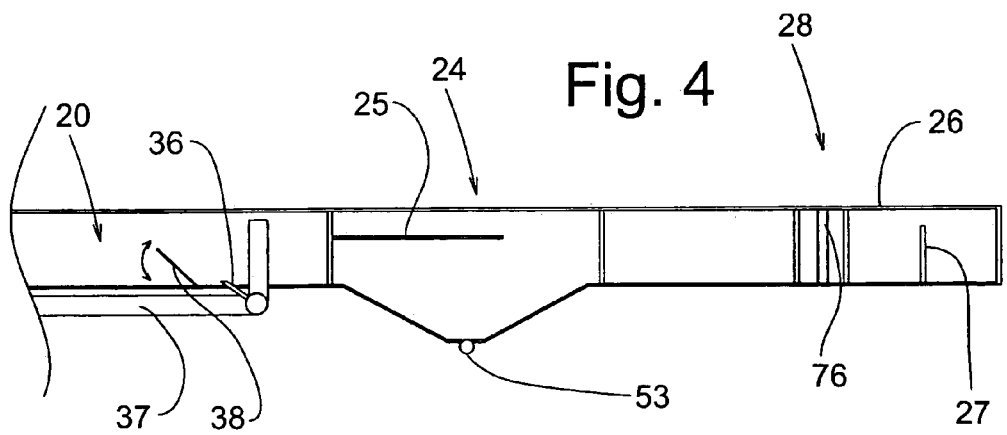
FIG. 4 is a an enlarged partial side elevational cross-sectional view of one end of the of the scalable fish rearing raceway system constructed in accordance with the present invention, illustrating the floor spoilers, the hydrocone structure, and the fish harvesting/grading channel in greater detail.

Turning now to FIG. 4, a cross-sectional view of one end of the of the scalable fish rearing raceway system, the water jet supply pipe 37 supplying oxygenated water to the water jet outlets 36 is illustrated. Floor spoiler 38 is shown at about a 45 degree angle from the raceway floor. Excess water with a reduced particulate load moves from the upper center layer of the hydrocone 24 to the inner water treatment zone 20 through the hydrocone overflow tray 25. A hydrocone drain line 53 removes solid particulates from the sloped bottom. The cross section of the harvesting/grading portal area 28 shows the placement of the grader gate panel 76 allowing the larger fish to enter the harvesting/grading channel 26 containing the partition wall 27 during harvesting or grading operations.

Figure 5:
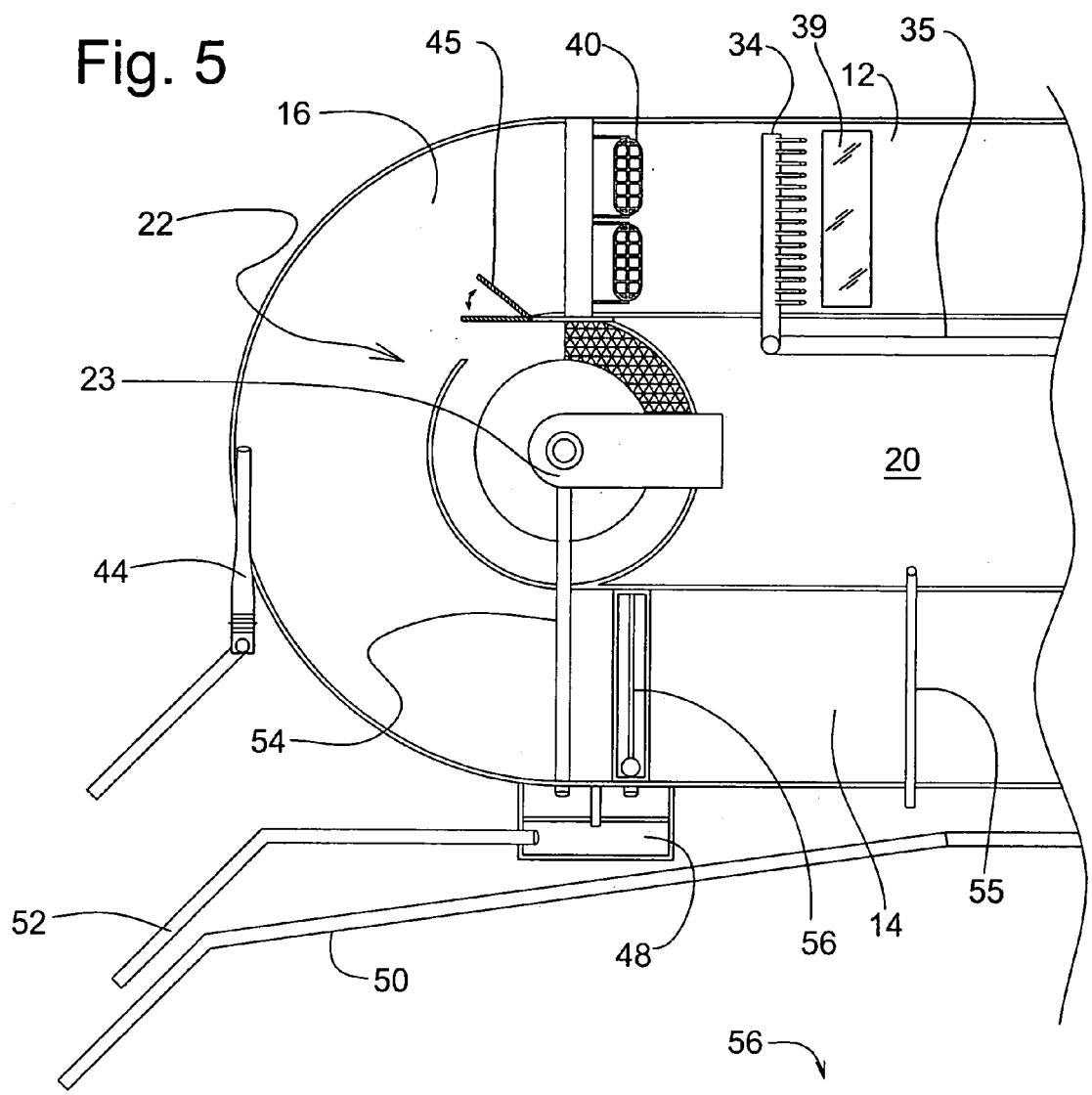
FIG. 5 is an enlarged partial plan view of the opposite end of the of the scalable fish rearing raceway system constructed in accordance with the present invention, illustrating the hydrocone structure, passive fish mortality removal ramp, water inflow piping, effluent outflow piping and drain box structures in greater detail.

Referring to FIG. 5, an enlarged partial plan view of one end of the of the scalable fish rearing raceway system, the hydrocone structure 22 and hydrocone overflow tray 23 are shown at one end of the inner water treatment zone 20. The end portion of the elongated fish channel raceways 12 and 14 are adjacent to the semi-circular end section 16.

A water jet supply pipe 35 provides oxygenated water to the water jet outlets 34. The paddlewheel 40 removes carbon dioxide from the water.

Large particles of solid material are removed from the elongated fish channel raceway 14 after collection in the fish channel drain box 56. The effluent from the hydrocone structure 22 flows to the drain box 48 by means of a hydrocone drain line 54. The effluent from the drain box 48 is removed for treatment by the effluent pipes, namely effluent pipe 50 for drain box 48 and effluent pipe 52 for drain box 46 (as shown in FIG. 1).

A center zone drainpipe 55 provides drainage for the inner water treatment zone 20. Fresh water enters the semi-circular end section 16 by means of a fresh water inflow pipe 44. The fresh water enters the semi-circular end section 16 to ensure complete mixing and to help regulate water velocity.

Figure 6:
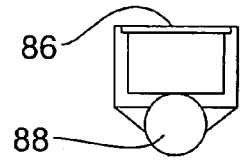
FIG. 6 is a vertical cross-sectional view of one floor drain box constructed in accordance with the present invention, illustrating the grate and drain pipe structure.

A submerged vertical screen panel 45 adjustably extends out from the entrance to hydrocone 22 to direct dead and dying fish into the hydrocone structure 22 (see FIG. 5 and FIG. 6 for more detail on the passive mortality removal apparatus).

FIG. 6 illustrates a vertical cross-sectional view of one fish channel drain box 56 with a drain box screen 86 and drain box drain pipe 88 structure.

Figure 7:
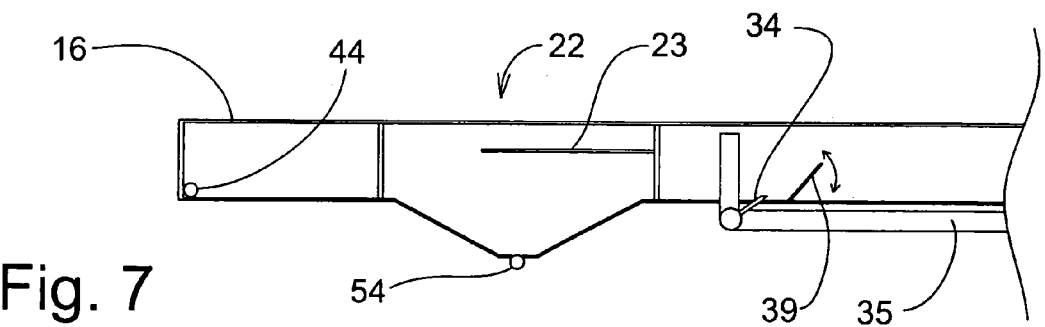
FIG. 7 is an enlarged partial side elevational cross-sectional view of the opposite end of the of the scalable fish rearing raceway system constructed in accordance with the present invention, illustrating the hydrocone structure.

Turning now to FIG. 7, a cross-sectional view of one end of the of the scalable fish rearing raceway system, the water jet supply pipe 35 supplying oxygenated water to the water jet outlets 34 is illustrated. A hydrocone overflow tray 23 is seen in the hydrocone structure 22 which delivers reduced particulate load water to inner water treatment zone 20. A hydrocone drain line 54 removes solid particulates from the sloped bottom. A fresh water inflow pipe is seen in the cross section of the semi-circular end section 16.

Figure 8:
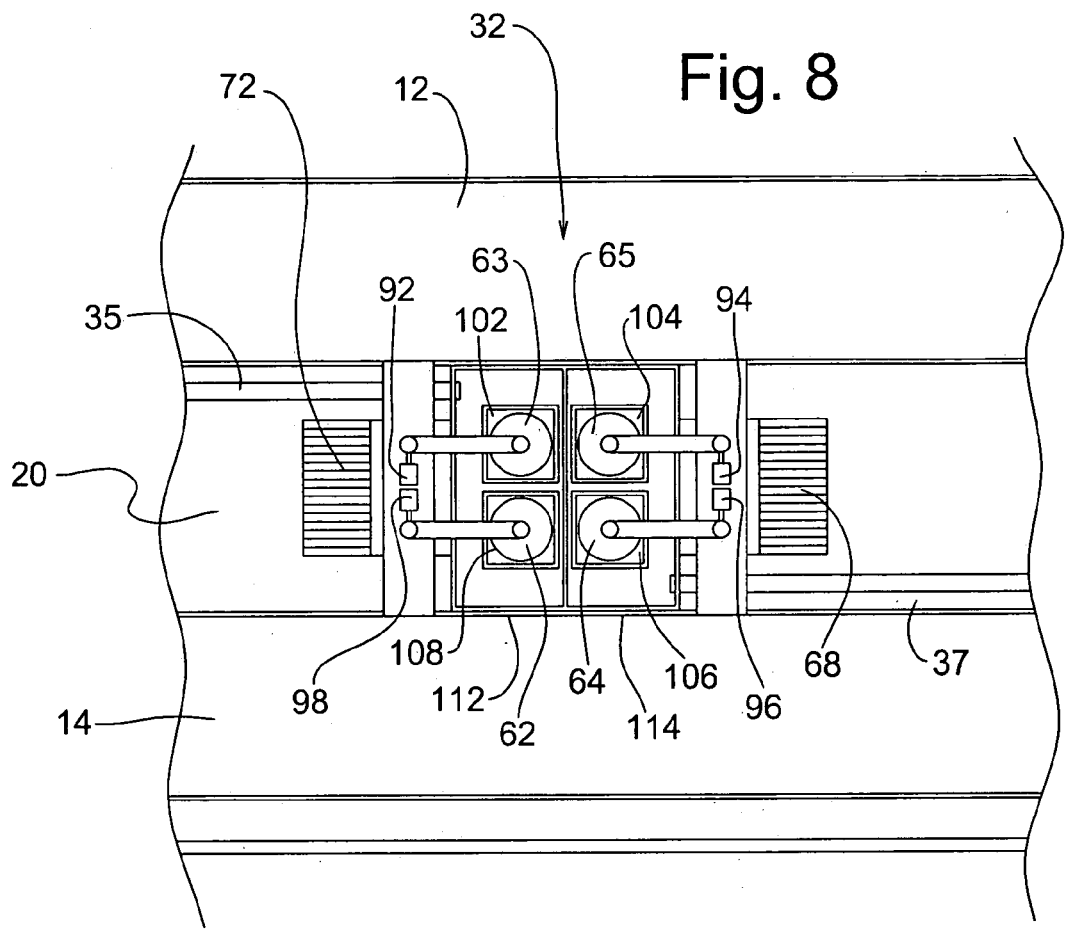
FIG. 8 is an enlarged partial plan view of the central portion of the scalable fish rearing raceway system constructed in accordance with the present invention, illustrating the oxygenation U-tube and water propulsion means in greater detail.

Referring now to FIG. 8, there is illustrated a central pump head tank 32 within the inner water treatment zone 20 and adjacent to the elongated fish channel raceways 12 and 14. Sloped screens 72 and 74 are located on either side of the central pump head tank 32. Four pumps 92, 94, 96 and 98 are connected to U-tube chambers 102, 104, 106 and 108 which terminate in U-tube cone bottom outlets 62, 63, 64 and 65 within the central pump head tank 32. The U-tube chambers 102, 104, 106 and 108 provide increased hydrostatic pressure to assist oxygen to dissolve into solution. The U-tube bottom outlets 62, 63, 64 and 65 maximize gas transfer and require less horsepower because of the low pumping head pressure in this configuration. The pumps supply highly oxygenated water to the water jet supply pipes 35 and 37 which return the treated and oxygenated water back to the fish rearing raceways 12 and 14. Additionally, the pump suction intakes provide the driving force to pull water from fish rearing raceways 12 and 14 through the circular velocity hydrocone and into the inner water treatment zone 20. Weir board overflow slots 112 and 114 control head tank 32 water levels.

Figure 9:
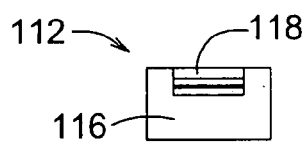
FIG. 9 is a vertical cross-sectional view of one U-tube overflow head weir board accepting means constructed in accordance with the present invention, illustrating the positioning of optional weir boards when inserted into place.

FIG. 9 illustrates weir board overflow slots 112 with optional multiple weir board inserts 118 (the additional of which raises the water spill over level) in a weir board support housing 116.

Figure 10:
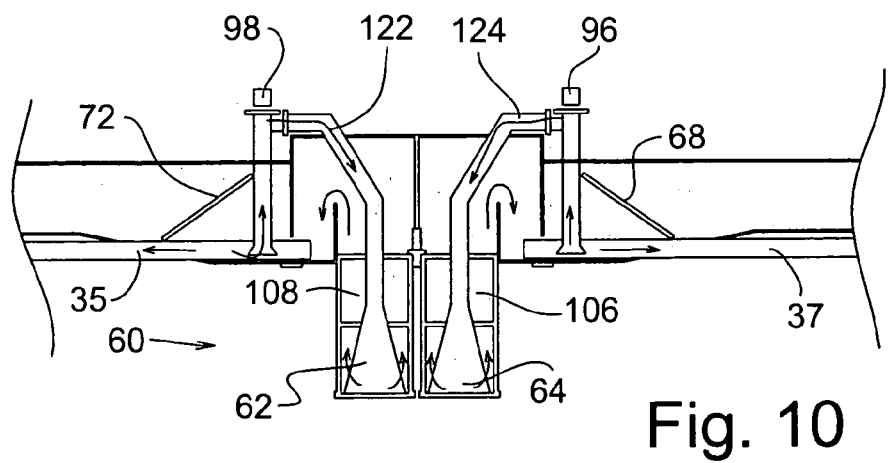
FIG. 10 is an enlarged partial side elevational cross-sectional view of the central portion of the scalable fish rearing raceway system constructed in accordance with the present invention, illustrating the oxygenation U-tube and water propulsion means in greater detail.

Referring now to FIG. 10, there is illustrated the U-tube oxygenation system 60 in greater detail. The sloped screens 72 and 74 are located on either side of the pumps 96 and 98 intakes. These sloped screens 72 and 74 separate the inner water treatment zone 20 from the U-tube oxygenation system 60. The pumps are connected to the U-tube cone bottom outlets 62 and 64 by means of the discharge pipes 122 and 124. The U-tube cone bottom outlets 62 and 64 are housed in the U-tube chambers 106 and 108. The pumps deliver water through the U-tubes 62 and 64 into the U-tube 106 and 108 to the water jet supply pipes 35 and 37 that return the treated and oxygenated water to the fish rearing raceways 12 and 14.

Figure 11:
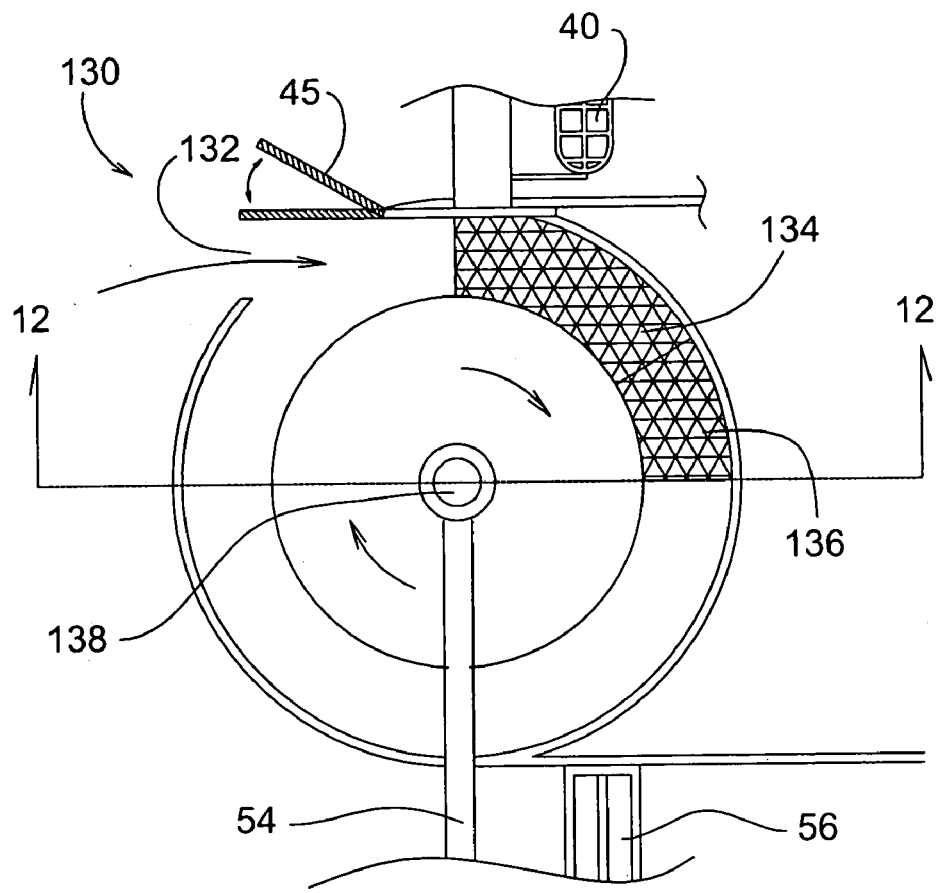
FIG. 11 is an enlarged partial plan view of the hydrocone structure in accordance with the present invention, illustrating the position of the mort catcher platform in greater detail.

Turning to FIG. 11, the hydrocone structure 130 is shown in greater detail illustrating the direction of water flow as it enters the water inlet 132. The mort catcher ramp 134 is positioned in such a manner that the settled debris and any non-floating moribund or dead fish are carried passively up the ramp 134 onto the mort catcher platform 136 by the horizontal and radial movement of water to the hydrocone structure 130 (water flow shown by arrows). The floating debris and dead fish are then easily removed from the mort catcher platform 136. The drain outlet 138 is located in the center of the hydrocone structure 130 and any heavy particulate matter settles in the hydrocone structure 130 aided by the centrifugal forces of the circular water flow patterns and is removed by the hydrocone drain line 54. A portion of the adjacent fish channel drain box 56 and the paddlewheel 40 are shown.

Figure 12:
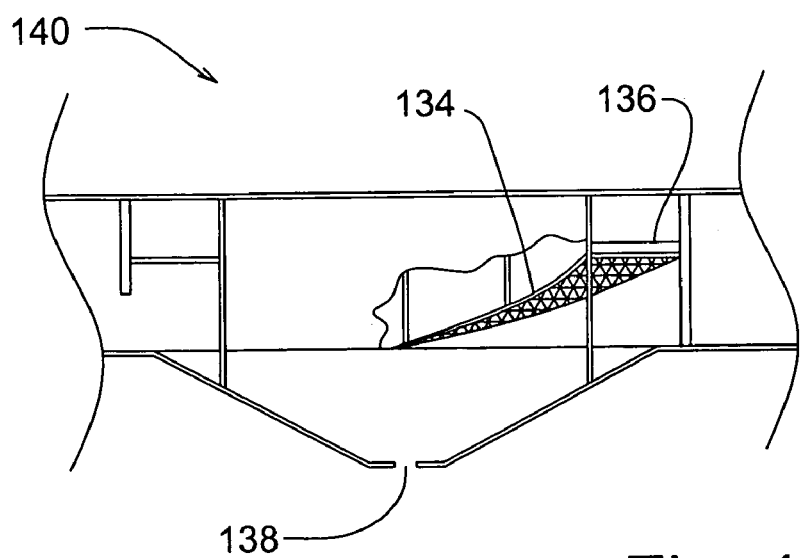
FIG. 12 is an enlarged partial side elevational cross sectional view of the hydrocone structure in accordance with the present invention, illustrating the mort catcher ramp and platform in greater detail.

FIG. 12 is a side view of the hydrocone structure 140, illustrating the mort catcher ramp 134 and mort catcher platform 136 in greater detail. The drain outlet 138 is seen at the center of the sloped bottom of the side view of the hydrocone structure 140.

Referring now to both FIG. 11 and FIG. 12, when in operation, the continuous removal of dead fish from the raceway is accomplished by means of two separate devices:
(a) a sinking fish mortality catcher which passively captures freshly dead and dying fish, and (b) a floating fish mortality catcher designed to passively capture the few non-fresh dead fish that manage to bypass the first device.

Because freshly dead or dying fish are usually denser than the surrounding water medium, they sink to the bottom of the fish zone and are carried by the water current around the main fish tank floor. Centrifugal action created by the water changing directions at both circular end zones causes all particles heavier than water, including freshly dead and dying fish, to be passively transported along the floor toward the center wall structures (see arrow in FIG. 11) until the fish reach the submerged entrance 132 to the hydrocone structure. Similarly, any particulate matter less dense than water, including non-fresh or "bloated" dead fish, will move to the outer wall water surface by the same centrifugal water forces. The continuous removal of dead and dying fish significantly reduces labor costs associated with difficult and frequent manual netting of such fish, and greatly reduces the transmittal of infectious diseases by the immediate removal of bacteria and parasites associated with the dead and dying fish.

The sinking fish mortality catcher consists of an inclined screened ramp 134 located immediately inside the submerged water entrance 132 to the hydrocone. The screened ramp 134 starts at the floor and climbs to the water surface along a 90 degree arc of the circular hydrocone wall. To further enhance the rapid capture and removal of these dead or sick fish, a submerged vertical screen panel 45 adjustably extends out from this entrance to direct fish into the screened ramp before they have actually moved close enough to the entrance to be drawn in by water suction alone (also see FIG. 5), thereby increasing the size of the entrance. Once through the submerged entrance 132, water current carries the fish to the floor of the inclined screen ramp 134. A separate short wall on the inside edge of this ramp forces the incoming water to uniformly and horizontally pass through the screen ramp 134 along its entire length. The horizontal force vector of the water passing through the screen causes the fish to be passively moved along the screen and carried to the water surface where they are collected in a small screened trap 136 for final disposal. However, the water velocity that carries dead fish into the hydrocone and mort catcher is not great enough to capture or hold healthy fish which may freely enter and exit the hydrocone entrance 132 at will.

Additionally, a floating fish mortality catcher (not shown in FIG. 12, for detail see FIG. 3) is mounted at the outside wall edge on the downstream side of the oval fish section adjacent to one of the main drain boxes. A vertically oriented screen panel extends into the water current at approximately 45 degrees relative to the water flow and passively directs floating dead fish outside of the raceway into the main drain boxes where they are collected in a screened trap for final disposal. These devices are also applicable to any tank shape, including round tanks, where centrifugal water action is available to passively move sinking dead fish towards the center floor of the tank and floating dead fish towards the outer wall water surface of the tank.

Figure 13:
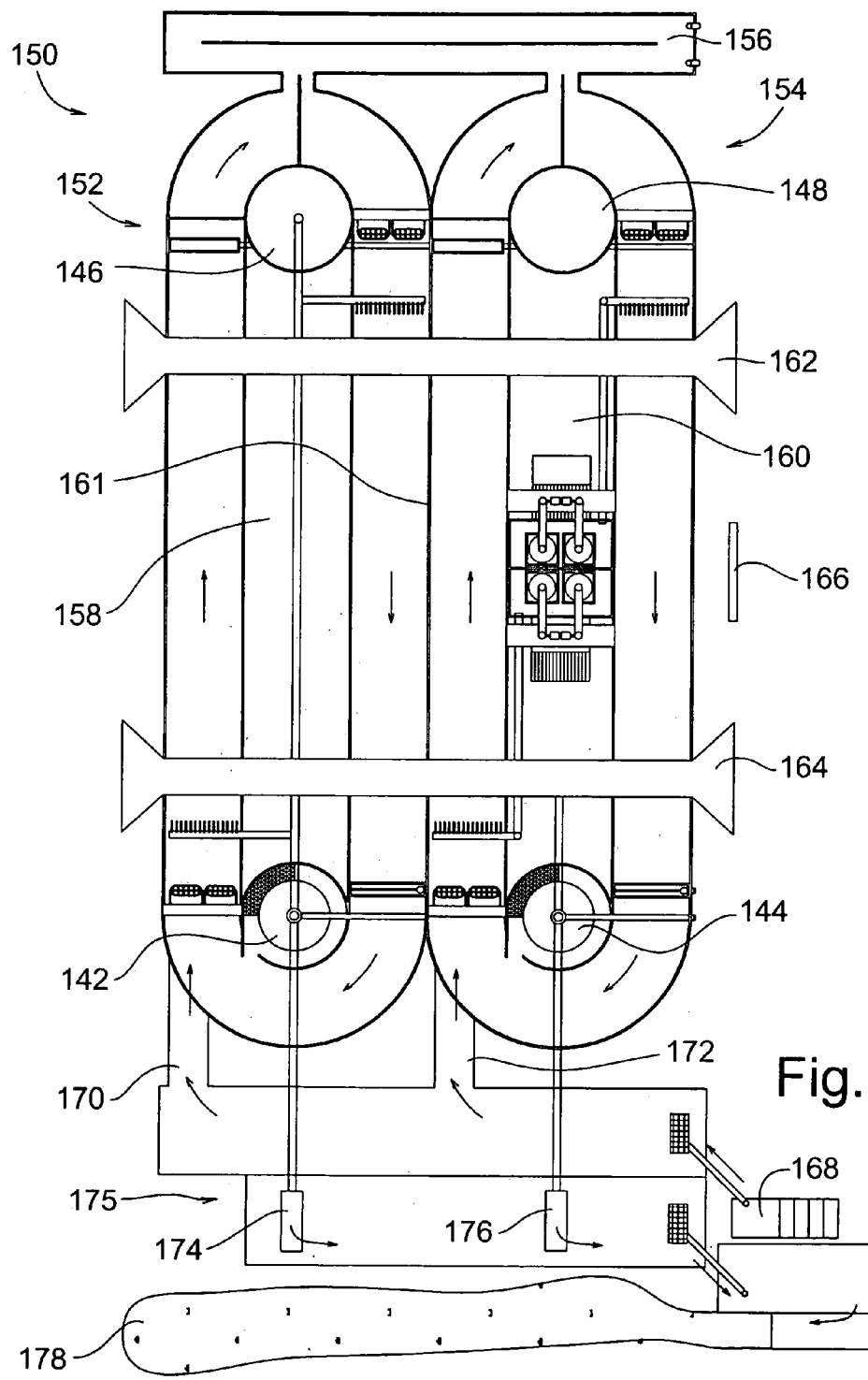
FIG. 13 is a plan view of another embodiment of the scalable fish rearing raceway system constructed in accordance with the present invention, illustrating a double array of parallel linear fish rearing areas with semi-circular ends, and the positioning of the central water treatment zone, two hydrocone structures in one of the raceways and common fish harvesting/grading channel.

Turning now to FIG. 13, there is shown an alternative embodiment, a double array fish rearing system 150. Two elongated oval raceways 152 and 154 are constructed adjoining one another, both connected to a common harvesting/grading channel 156 and having a common inner wall 161. By constructing double and multiple arrays such as this having common inner walls, both economy of construction and more efficient land use (less area is required to produce more fish crop) is realized.

A partial hydrocone structure 146 and an unused space 148 illustrate two possible embodiments that may be employed depending upon the requirements of the system. Two hydrocone structures 142 and 144 are shown at one end of each of the two elongated oval raceways 152 and 154. Additionally, an unused inner zone 158 and an inner water treatment zone 160 represent potential embodiments. Drivable overpass bridges 162 and 164 provide convenient access to service vehicles.

Water inlets 170 and 172 provide fresh water from a water source 168 in this particular embodiment. Drain outlets 174 and 176 direct effluent from the system into the effluent (tilapia) channel 175. The effluent then flows to a centralized water treatment system such as the SMART system described in U.S. Pat. No. 6,447,681, employing the biofilm carrier elements as described in U.S. design patent D465,357 (both granted to Kent Sea Tech Corporation), and on to a constructed wetland 178 for further removal of particulates and waste compounds.

Figure 14:
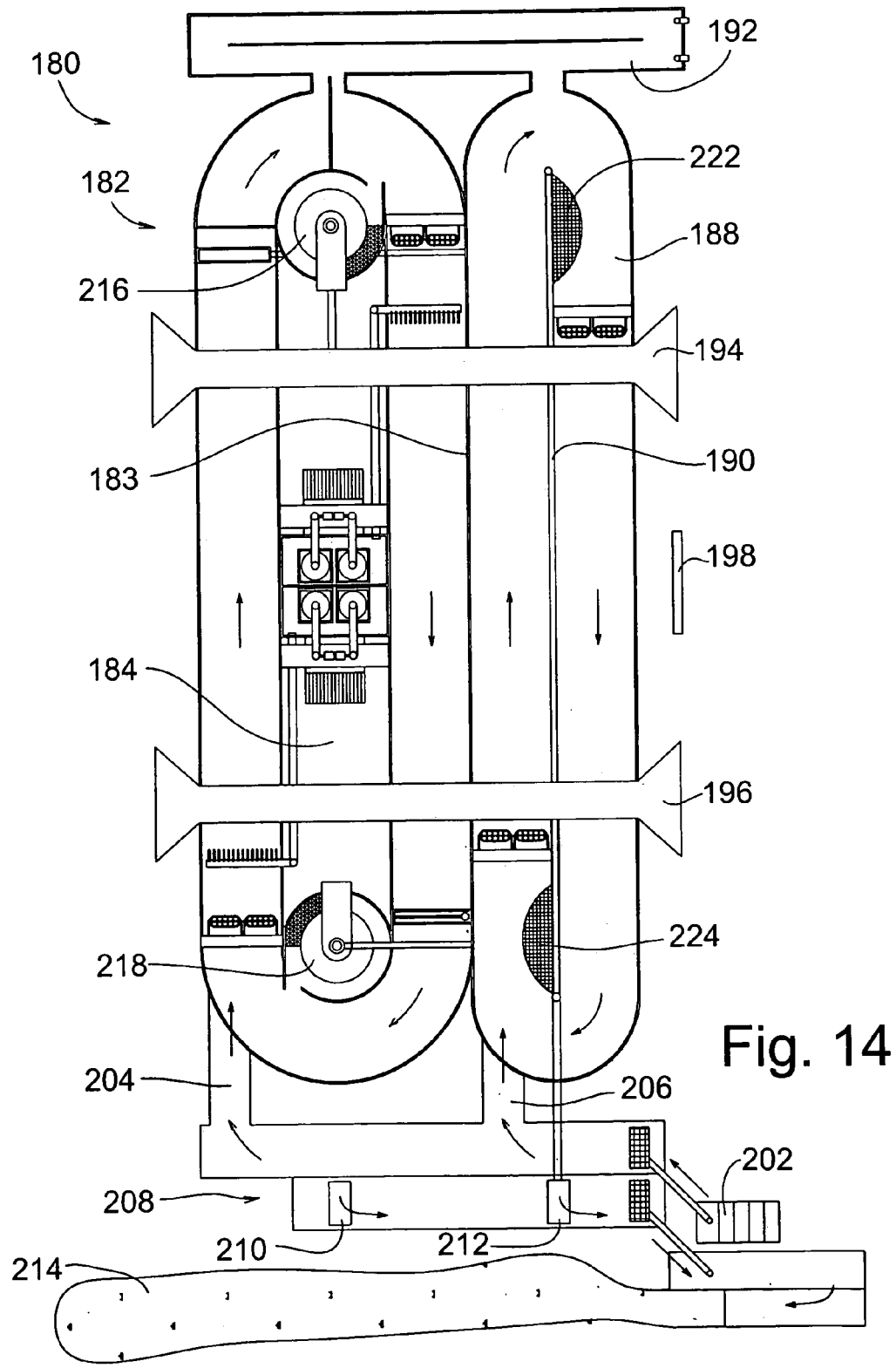
FIG. 14 is a plan view of yet another embodiment of the scalable fish rearing raceway system constructed in accordance with the present invention, illustrating a parallel linear fish rearing area with semi-circular ends with the central water treatment zone, and two hydrocone structures, attached to a second parallel linear fish rearing area with semi-circular ends with no central water treatment zone or hydrocone structures and common fish harvesting/grading channel.

Finally, FIG. 14 illustrates another embodiment of a double array of fish rearing system 180. A common harvesting/move channel 192 is connected to a full raceway 182 and a full volume raceway 188 having no inner zone. Both raceway 182 and 188 share a common wall 183 which confers a space saving advantage as well as a decreased overall construction cost.

The full raceway 182 is shown here with an inner water treatment zone 184 and two hydrocone structures 216 and 218. Interconnecting end portals lead to a common fish harvesting/grading channel 192 which allows grading, counting and transfer of fish completely underwater, with no netting stress to fish. Furthermore, underwater electronic means of sizing, grading and counting fish is employed within the harvesting/grading channel 192, to further reduce fish stress related to these necessary activities.

A center wall structure 190 is shown in the full volume raceway 188 not containing an inner water treatment zone (as previously described). Alternatively, one or more raceways similar to raceway 188 having no inner water treatment zone can be connected to a centralized common water treatment system such as that described in U.S. Pat. No. 6,447,681 granted to Kent Sea Tech Corporation. Flow modulators 222 and 224 are located at either end of the full volume raceway 188. An electronic control panel 198 gives operators input from monitoring equipment which are linked to an alarm system and also provides operators with control of the components of the system. Two driveable overpass bridges 194 and 196 allow access to the double array fish rearing system 180 by service vehicles and other equipment.

Inlets 204 and 206 provide fresh water from the water source 202. Drain outlets 210 and 212 direct effluent from the embodiment of double array of fish rearing system 180 to the effluent (tilapia) channel 208. The effluent continues to a centralized water treatment system such as the SMART system described in U.S. Pat. No. 6,447,681, possibly employing the biofilm carrier elements as described in U.S. design patent D465,357 (both granted to Kent Sea Tech Corporation), and on to constructed wetland 214 for further removal of particulates and waste compounds.

Finally, the system described herein has the further advantages of being easily covered to prevent bird predation, and to provide shade, for example, to shade carp in the inner zone (as well as fish in the exterior raceway channels). Moreover, the water velocity within the system (both fish rearing raceways and the inner water treatment zone) is readily controlled by a combination of adjusting the pumps, flow jets, and floor spoilers, all integrated into the system.

It should be understood, however, that even though these numerous characteristics and advantages of the invention have been set forth in the foregoing description, together with details of the structure and function of the invention, the disclosure is illustrative only, and changes may be made in detail, especially in matters of shape, size, chemistry and arrangement of components and parts within the principal of the invention to the full extent indicated by the broad general meaning of the terms in which the appended claims are expressed.

What is claimed is:

1. A scalable fish rearing raceway system comprising:
one or more fish containment structures having two or more parallel linear fish channels with semi-circular end sections, and having a walled off centrally located inner portion for housing water propulsion means, water treatment means and dead and dying fish removal means, whereby said walled off centrally located inner portion is in fluid communication with said one or more fish containment structures;
fish harvesting/grading means further comprising a fish harvesting/grading channel in fluid communication with said one or more fish containment structures, whereby fish within said one or more fish containment structures are readily sized, and subsequently separated out for either retention in said fish containment structure for further growth or transferral to said fish harvesting/grading channel for harvesting from said fish containment structure; and
one or more passive dead and dying fish removal means, whereby floating dead or submerged dead or dying fish are continuously removed from said fish containment structure passively by employing water current only, whereby said fish removal means further comprises;
(a) a circular hydrocone structure in fluid communication with the water within said one or more fish containment structures, having a conical bottom with walls sloping down to an opening outlet to allow sinking debris and particulate matter to be removed from said circular structure;
(b) a submerged vertical screen panel adjustably extending out from said circular hydrocone structure forming an entrance to direct fish into said dead and dying fish removal apparatus; and
(c) a screened ramp which starts at the floor of the fish rearing tank or raceway and uniformly climbs to the water surface along a 90 degree arc of said circular hydrocone structure wall to a flat portion located at the top of said screened ramp;
whereby the water flow within said one or more fish containment structures is used to passively deposit dead and dying, both floating and submerged fish into the hydrocone structure, up the screened ramp and onto said flat portion at the water surface, where the dead and dying fish are held for easy mechanical removal from the fish rearing system.

2. The scalable fish rearing raceway system according to claim 1, wherein said fish harvesting/grading channel in fluid communication with said one or more fish containment structures includes fish passageways between said harvesting/grading channel and fish containment means, whereby said passageways accommodate insertable solid barriers which prevent all fish from traveling to said harvesting/grading channel, and insertable mesh or bar barriers which selectively allow fish of varying size to pass into said harvesting/grading channel.

3. The scalable fish rearing raceway system according to claim 1, wherein said one or more passive dead and dying fish removal means including said hydrocone structure being integrated in said walled off centrally located inner portion of said semi-circular end sections of said fish containment structure, said hydrocone structure having an arc-shaped fish removal ramp located on the outer edge of said hydrocone structure, whereby said ramp decreases in depth as the water flows into it in a circular direction and floating or submerged dead or dying fish are passively washed up and out of the water within said hydrocone structure.

4. The scalable fish rearing raceway system according to claim 3, wherein said integrated hydrocone structure includes a water outlet located centrally at the bottom of its conical structure for the purpose of allowing sinking debris to be washed out of said hydrocone structure.

5. The scalable fish rearing raceway system according to claim 1, wherein said fish containment structure includes two or more fish containment structures each having three or more parallel linear fish production raceway zones with semi-circular end sections and a common inner dividing wall.

6. The scalable fish rearing raceway system according to claim 5, wherein said fish production raceway zones includes one or more particulate removal means, said particulate removal means further comprising a screened drain box located in the floor of said fish production raceway zone.

7. The scalable fish rearing raceway system according to claim 1, further comprising electronic or microprocessor controlled water conditions monitoring means includes sensors for monitoring water clarity, water temperature, water dissolved oxygen content, water ammonia content, water pH, water carbon dioxide content, and water mineral content.

8. The scalable fish rearing raceway system according to claim 1, wherein said walled off centrally located inner portion of said fish containment structure includes a water treatment zone which houses and supports effluent wastewater treatment means.

9. The scalable fish rearing raceway system according to claim 1, further comprising water velocity control means includes a series of water jets located on the floor of said fish containment structure, having a baffle means adjustably mounted in the floor of the raceway in front of the said jets, whereby the angle of said baffle means is varied to regulate water velocity within said fish containment structure.

10. The scalable fish rearing raceway system according to claim 9, wherein said water velocity control means further includes adjustable floor spoilers which can be lowered and raised to more accurately control and optimize the water velocity within the fish rearing zones.

11. A method for making a scalable fish rearing raceway system comprising the steps of:
(a) providing one or more fish containment structures having two or more parallel linear fish channels with semi-circular end sections, and having a walled off centrally located inner portion for housing water propulsion means, water treatment means and dead and dying fish removal means, whereby said walled off centrally located inner portion ins in fluid communication with said one or more fish containment structures;
(b) providing water intake means, water outflow means, water propulsion means, water circulation means, and water velocity control means, all in fluid communication with said one or more fish containment structures;
(c) providing fish harvesting/grading means further comprising a fish harvesting/grading channel in fluid communication with said one or more fish containment structures, whereby fish within said one or more fish containment structures are readily sized, and subsequently separated out for either retention in said fish containment structure for further growth or transferral to said fish harvesting/grading channel for harvesting from said fish containment structure; and;
(d) providing one or more dead and dying fish removal means, whereby floating dead or submerged dead or dying fish are continuously removed from said one or more fish containment structures by passively employing water current only, whereby said fish removal means further comprises;
(a) a circular hydrocone structure in fluid communication with the water within said one or more fish containment structures, having a conical bottom with walls sloping down to an opening outlet to allow sinking debris and particulate matter to be removed from said circular structure;
(b) a submerged vertical screen panel adjustably extending out from said circular hydrocone structure forming an entrance to direct fish into said dead and dying fish removal apparatus; and
(c) a screened ramp which starts at the floor of the fish rearing tank or raceway and uniformly climbs to the water surface along a 90 degree arc of said circular hydrocone structure wall to a flat portion located at the top of said screened ramp;
whereby the water flow within the fish rearing tank or raceway is used to passively deposit dead and dying, both floating and submerged fish into the hydrocone structure, up the screened ramp and onto said flat portion at the water surface, where the dead and dying fish are held for easy mechanical removal from the fish rearing system.

12. The method for making a scalable fish rearing raceway system according to claim 11, wherein said step of providing said fish harvesting/grading channel in fluid communication with said one or more fish containment structures further includes providing fish passageways between said harvesting/grading channel and fish containment means, whereby said passageways accommodate insertable solid barriers which prevent all fish from traveling to said harvesting/grading channel, and insertable mesh or barriers which selectively allow fish of varying size to pass into said harvesting/grading channel.

13. The method for making a scalable fish rearing raceway system according to claim 11, wherein said step of providing said floating dead or dying fish removal means further includes the step of providing said hydrocone structure being integrated in said central portion of said one or more fish containment structures, said hydrocone structure having an arc-shaped fish removal ramp located on the outer edge of said hydrocone structure, whereby said ramp decreases in depth as the water flows into it in a circular direction and floating dead or dying fish are washed up and out of the water within said hydrocone structure.

14. The method for making a scalable fish rearing raceway system according to claim 13, wherein said step of providing said integrated hydrocone structure further includes providing a water outlet centrally located at the bottom of its conical structure for the purpose of allowing sinking debris to be washed out of said hydrocone structure.

15. The method for making a scalable fish rearing raceway system according to claim 11, wherein said step of providing said one or more fish containment structures further includes the step of providing one or more fish containment structures each having three or more parallel linear fish production raceway zones with semi-circular end sections and a common inner dividing wall.

16. The method for making a scalable fish rearing raceway system according to claim 11, wherein said step of providing said fish production raceway zones further includes providing one or more particulate removal means, said particulate removal means further comprising a screened drain box located in the floor of said fish production raceway zone.

17. The method for making a scalable fish rearing raceway system according to claim 11, further including the step of providing electronic or microprocessor controlled water conditions monitoring means further includes providing sensors for monitoring water clarity, water temperature, water dissolved oxygen content, water ammonia content, water pH, water carbon dioxide content, and water mineral content.

18. The method for making a scalable fish rearing raceway system according to claim 11, wherein said step of providing said walled off centrally located inner portion of said fish containment structure further includes the step of providing a water treatment zone which houses and supports effluent wastewater treatment means within said walled off centrally located inner portion.

19. The method for making a scalable fish rearing raceway system according to claim 11, wherein said step of providing said water velocity control means further includes providing a series of water jets located on the floor of said fish containment structure, having a baffle means adjustably mounted in the floor of the raceway in front of the said jets, whereby the angle of said baffle means is varied to regulate water velocity within said fish containment structure.

* * * * *